Oct. 7, 1958  F. GERHARDT  2,855,213
PINCHED FRAME OR CHASSIS FOR VEHICLE
Original Filed July 28, 1953
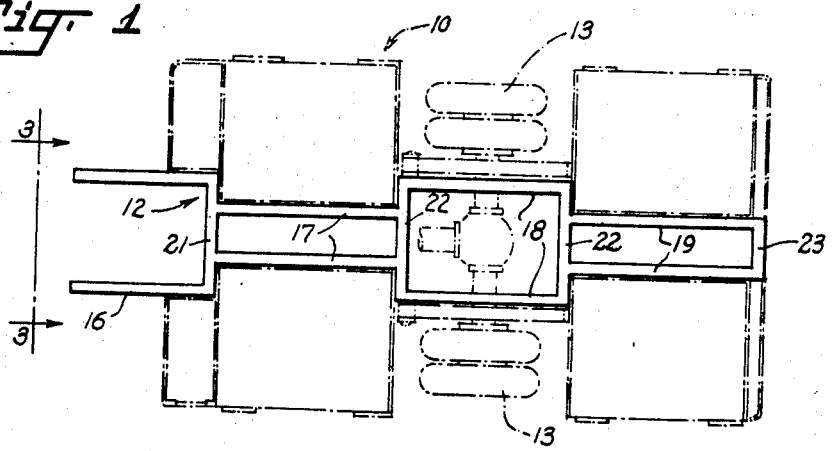
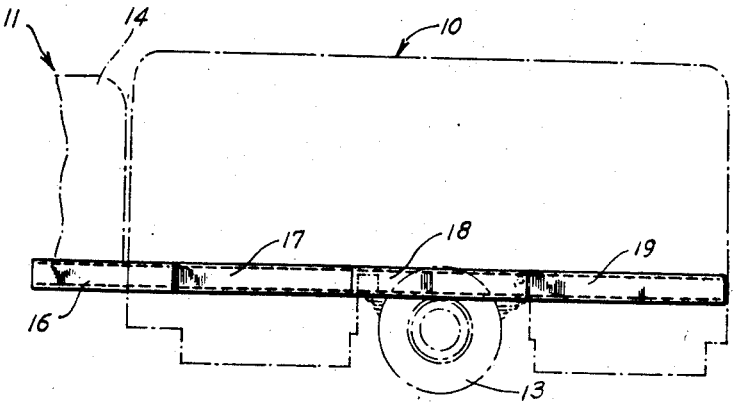
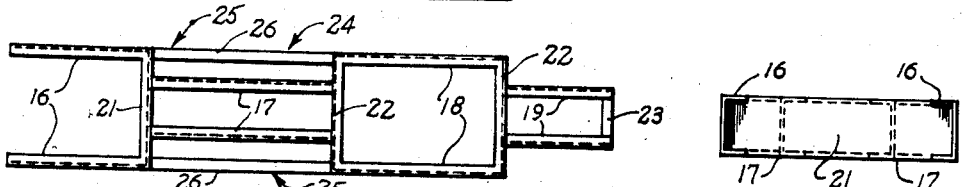
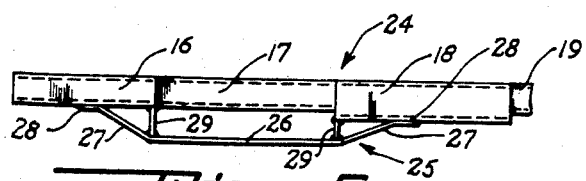
Inventor
Fred Gerhardt
By Sherwin Levy
Attorney United States Patent Office 2,855,213
Patented Oct. 7, 1958

2,855,213

PINCHED FRAME OR CHASSIS FOR VEHICLE

Fred Gerhardt, Fresno, Calif., assignor of one-half to Bernard Werfel, Fresno, Calif.

Original application July 28, 1953, Serial No. 370,752. Divided and this application June 10, 1957, Serial No. 664,719

3 Claims. (Cl. 280—106)

This invention relates to a vehicle, and more particularly to a load supporting body for a vehicle.

This invention is a division of my application Serial No. 370,752.

The object of the invention is to provide a pinched frame chassis or supporting body for a vehicle.

Another object of the invention is to provide a vehicle frame which is pinched in two places, namely, immediately to the rear of the cab of a vehicle such as a truck, and immediately to the rear of that part of the frame over the rear end, the frame of the present invention serving to support a body with a greatly increased capacity to greatly lower the center of gravity of the vehicle.

A further object of the invention is to provide a pinched frame body which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a plan view of the pinched frame body relating to the present invention.

Figure 2 is a side elevational view of the body.

Figure 3 is an end elevational view of the chassis or body, and taken on the line 3—3 of Figure 1.

Figure 4 is a plan view of a modified chassis.

Figure 5 is a side elevational view of the modified device or assembly shown in Figure 4.

Reference is made to applicant's Patent No. 2,596,478, and in the present application, the claims are directed to an improvement of the frame structure shown in the patent.

Referring in detail to the drawings the numeral 10 designates a support body mounted on a vehicle such as a truck 11, broken lines, Figures 1 and 2, and the present invention is directed to a pinched frame or chassis 12.

The frame 12 can be used on any desired type of vehicle, and the drawings illustrate the chassis or frame being used with a truck having a cab 14 and rear wheels 13. The frame 12 may be made of any suitable material such as channel iron and the frame 12 includes a forward portion 16 which serves to support the cab 14 and the engine of the truck. A narrowed portion 17 is arranged rearwardly adjacent to the forward portion, and a portion 18 is symmetrically located relative to the rear wheels 13, there being a rearward narrowed portion 19 provided. These portions are arranged in alignment with respect to the longitudinal axis of the truck.

The forward portion 16 and the portion 18 are conveniently of the same width and may be of the usual width for the members of the truck frame. The narrowed portions 17 and 19 are preferably of the same width and are substantially narrower than the portions 16 and 18. Any suitable dimensions may be used as desired.

Each of the portions 16, 17, 18 and 19 may be fabricated of parallel channel iron members which are interconnected together at their ends. The rearward ends of the channel iron members of portion 16 and the forward ends of the members of portion 17 are interconnected by a transverse strut 21 of channel iron or other suitable material. Furthermore, a pair of central struts 22 interconnect the rearward ends of the members of the portion 17 and the forward ends of the members of the portion 18 as well as the rearward ends of the members of portion 18 with the forward ends of the members of the portion 19. A rearwardly positioned transverse strut 23 interconnects the rearward ends of the members of the portion 19.

From the foregoing it will be seen that there has been provided a frame for use with trucks and the like which possesses great strength and rigidity and the narrow portions of the frame 17 and 19 may be used to accommodate downward extensions of panels and the like.

Referring to Figures 4 and 5 of the drawings, there is shown a slightly modified form of the invention wherein the frame is indicated generally by the numeral 24. The frame 24 has the same construction as the previously described frame 12 except that a pair of spaced parallel reinforcing bars or beams 25 are provided. Each of the beams 25 includes an intermediate horizontally disposed section 26 that has an inclined section 27 extending upwardly from each end thereof. Each of the inclined sections 27 terminates in a flat section 28 which is secured as by welding to the undersurface of the portions 16 and 18. Vertically disposed bars 29 extend downwardly from the portions 16 and 18 and are secured to the beams 25 in any suitable manner, as for example by welding.

From the foregoing it is apparent that a pinched frame chassis has been provided which can be used with various types of vehicles. The frame is pinched in two places to provide the narrow portions 17 and 19. These narrow portions are immediately to the rear of the cab and immediately to the rear of that part of the frame over the rear end. The basic purpose of the present invention is to support a body with a greatly increased capacity to thereby greatly lower the center of gravity of the vehicle. Further, the frame will accommodate a body within the maximum width that will still carry a load larger than any other similar body of the same width and with the present frame roadability of the vehicle is increased. Further, severe racking is avoided and torque and twist is practically eliminated because of the lower center of gravity and the narrow frame and body. The cubic foot displacement is increased at a lower center of gravity and the height of the body to be built upon the frame is not limited because the body may be built adjacent to the narrowed portion of the frame and substantially lower at the same time since it is supported by the frame, all within the legal width of truck bodies.

Further, the frame provides a chassis for mounting a low gravity center body of increased capacity at a cost much lower than a low gravity center vehicle which is especially built upon special rear ends and lower chassis construction. Thus, there has been provided a pinched frame which provides economically a vehicle with an extremely low center of gravity for carrying an increased capacity load. This low center of gravity permits loading of the vehicle in record time. Various types of bodies can be supported on the frame or chassis as for example a sliding door van may be supported thereon.

I claim:

1. In a vehicle having ground engaging wheels, a pinched frame including a forward portion, a narrowed portion rearwardly adjacent to the forward portion, an intermediate portion symmetrically located relative to the rear wheels, a rearwardly narrowed portion, said portions being arranged in alignment relative to the longitudinal axis of the vehicle, said forward portion and intermediate portion being of the same width, and said narrowed portions being of the same width and substantially narrower than the forward and intermediate portions, a pair of spaced parrallel beams extending between said forward portion and intermediate portion, each of said beams including a horizontally disposed intermediate section, an inclined section extending upwardly from each end of said intermediate section, and a flat section extending from said inclined sections and secured to the undersurface of said forward and intermediate portions.

2. The apparatus as described in claim 1, and further including vertically disposed bars extending from said forward and intermediate portions and secured to said beams.

3. In a vehicle having ground engaging wheels, a pinched frame including a forward portion, a narrowed portion rearwardly adjacent to the forward portion, and an intermediate portion symmetrically located relative to the rear wheels, a rearwardly narrowed portion, said portions being arranged in alignment relative to the longitudinal axis of the vehicle, a pair of beams extending between said forward portion and intermediate portion, each of said beams including an intermediate section, an inclined section extending upwardly from each end of said intermediate section, the upper ends of said inclined sections being secured to the undersurface of said forward and intermediate portions.

References Cited in the file of this patent

UNITED STATES PATENTS 1,954,637  Linn ------------------ Apr. 10, 1934